US010756550B2

(12) United States Patent
Na et al.

(10) Patent No.: US 10,756,550 B2
(45) Date of Patent: Aug. 25, 2020

(54) BATTERY PROTECTION CIRCUIT MODULE AND BATTERY PACK COMPRISING SAME

(71) Applicant: ITM SEMICONDUCTOR CO., LTD., Chungcheongbuk-do (KR)

(72) Inventors: Hyuk Hwi Na, Chungcheongbuk-do (KR); Ho Seok Hwang, Gyeonggi-do (KR); Young Seok Kim, Chungcheongbuk-do (KR); Sang Hoon Ahn, Chungcheongbuk-do (KR)

(73) Assignee: ITM SEMICONDUCTOR CO., LTD., Chungcheongbuk-Do (KR)

( * ) Notice: Subject to any disclaimer, the term of this patent is extended or adjusted under 35 U.S.C. 154(b) by 351 days.

(21) Appl. No.: 15/749,635

(22) PCT Filed: Aug. 11, 2016

(86) PCT No.: PCT/KR2016/008824
§ 371 (c)(1),
(2) Date: Feb. 1, 2018

(87) PCT Pub. No.: WO2017/030211
PCT Pub. Date: Feb. 23, 2017

(65) Prior Publication Data
US 2018/0226816 A1 Aug. 9, 2018

(30) Foreign Application Priority Data

Aug. 20, 2015 (KR) .................. 10-2015-0117433
Jun. 23, 2016 (KR) .................. 10-2016-0078701

(51) Int. Cl.
*H02J 7/00* (2006.01)
*H02H 7/18* (2006.01)
(Continued)

(52) U.S. Cl.
CPC ......... *H02J 7/0029* (2013.01); *H01M 10/425* (2013.01); *H01M 10/44* (2013.01);
(Continued)

(58) Field of Classification Search
CPC .... H02J 7/0029; H02J 7/0068; H02J 7/00306; H02J 7/00304; H02J 7/00302;
(Continued)

(56) References Cited

U.S. PATENT DOCUMENTS

2009/0121683 A1* 5/2009 Goto .................. H02J 7/0031
320/134

FOREIGN PATENT DOCUMENTS

JP 2001-352683 12/2001
JP 2009-200978 9/2009
(Continued)

*Primary Examiner* — Zixuan Zhou
(74) *Attorney, Agent, or Firm* — Stuart H. Mayer; Mayer & Williams PC

(57) ABSTRACT

According to an aspect of the present invention, there is provided a battery protection circuit module including a first positive terminal and a first negative terminal electrically connected to electrode terminals of a battery bare cell, a second positive terminal and a second negative terminal electrically connected to a charger or an electronic device, a single field-effect transistor including a drain terminal, a source terminal, a gate terminal, and a well terminal, wherein the drain terminal is electrically connected to the first negative terminal and the source terminal is electrically connected to the second negative terminal, and a protection integrated circuit (P-IC) for controlling charging/discharging of the battery bare cell by controlling the gate terminal to control whether to switch on the single field-effect transistor and controlling a bias voltage of the well terminal by using an internal switch.

17 Claims, 10 Drawing Sheets

(51) Int. Cl.
*H01M 10/44* (2006.01)
*H01M 10/42* (2006.01)

(52) U.S. Cl.
CPC ............ *H02H 7/18* (2013.01); *H02J 7/0068* (2013.01); *H01M 2010/4271* (2013.01); *H02J 7/00302* (2020.01); *H02J 7/00304* (2020.01); *H02J 7/00306* (2020.01)

(58) Field of Classification Search
CPC ...... H02H 7/18; H01M 10/425; H01M 10/44; H01M 2010/4271
USPC .......................................... 320/128, 134, 136
See application file for complete search history.

(56) References Cited

FOREIGN PATENT DOCUMENTS

| | | |
|---|---|---|
| KR | 1020050057693 A | 6/2006 |
| KR | 1020070087501 A | 8/2007 |
| KR | 1020080077930 A | 8/2008 |
| KR | 1020080095838 | 10/2008 |

* cited by examiner

US 10,756,550 B2

BATTERY PROTECTION CIRCUIT MODULE AND BATTERY PACK COMPRISING SAME

TECHNICAL FIELD

The present invention relates to a battery for an electronic device and, more particularly, to a battery protection circuit module for protecting a battery cell, and a battery pack including the battery protection circuit module.

BACKGROUND ART

Batteries are generally used in electronic devices such as mobile phones and personal digital assistants (PDAs). As a battery most commonly used in mobile devices, etc., a lithium ion battery is heated when overcharge or overcurrent occurs, and even has the risk of explosion as well as performance degradation if heating is continued and temperature thereof is increased. Accordingly, the battery should include a battery protection circuit device for interrupting battery operation to prevent the performance degradation.

RELATED ART DOCUMENT

1. Korean Application Publication 10-2007-0044544 published on Apr. 30, 2007
2. Korean Patent Publication 10-0791551 registered on Dec. 27, 2007

DETAILED DESCRIPTION OF THE INVENTION

Technical Problem

Typical battery protection circuit devices use two field-effect transistors as switches to control charging and discharging. However, performance degradation may occur due to an increase in operation resistance and volume reduction may not be easily achieved.

The present invention provides a battery protection circuit module and a battery pack using a single field-effect transistor. However, the scope of the present invention is not limited thereto.

Technical Solution

According to an aspect of the present invention, there is provided a battery protection circuit module including a first positive terminal and a first negative terminal electrically connected to electrode terminals of a battery bare cell, a second positive terminal and a second negative terminal electrically connected to a charger or an electronic device, a single field-effect transistor including a drain terminal, a source terminal, a gate terminal, and a well terminal, wherein the drain terminal is electrically connected to the first negative terminal and the source terminal is electrically connected to the second negative terminal, and a protection integrated circuit (P-IC) for controlling charging/discharging of the battery bare cell by controlling the gate terminal to control whether to switch on the single field-effect transistor and controlling a bias voltage of the well terminal by using an internal switch, wherein the P-IC includes a reference terminal connected between the first negative terminal and the drain terminal, a detection terminal connected between the second negative terminal and the source terminal, and a bias terminal connected to the well terminal, wherein the bias terminal is always connected to one of the reference terminal and the detection terminal, and wherein the internal switch is connected between the bias terminal and the other of the reference terminal and the detection terminal, which is not always connected to the bias terminal.

In the battery protection circuit module, the P-IC may include a diode connected between the bias terminal and the one of the reference terminal and the detection terminal, which is connected to the bias terminal, to have a forward direction corresponding to a direction toward the bias terminal.

In the battery protection circuit module, the bias terminal may be always connected via the diode to the reference terminal, and the internal switch may be interposed between the bias terminal and the detection terminal.

In the battery protection circuit module, the bias terminal may be always connected via the diode to the detection terminal, and the internal switch may be interposed between the bias terminal and the reference terminal.

In the battery protection circuit module, the P-IC may further include an internal resistor connected in series to the diode between the bias terminal and the one of the reference terminal and the detection terminal, which is connected to the bias terminal.

In the battery protection circuit module, the P-IC may perform charging or discharging resumption after charging or discharging interruption by detecting connection of a charger or a load and turning on the single field-effect transistor.

According to another aspect of the present invention, there is provided a battery protection circuit module including a first positive terminal and a first negative terminal electrically connected to electrode terminals of a battery bare cell, a second positive terminal and a second negative terminal electrically connected to a charger or an electronic device, a single field-effect transistor including a drain terminal, a source terminal, a gate terminal, and a well terminal, wherein the drain terminal is electrically connected to the first negative terminal and the source terminal is electrically connected to the second negative terminal, and a protection integrated circuit (P-IC) for controlling charging/discharging of the battery bare cell by controlling the gate terminal to control whether to switch on the single field-effect transistor and controlling a bias voltage of the well terminal by using an internal switch, wherein the P-IC includes a reference terminal connected between the first negative terminal and the drain terminal, a detection terminal connected between the second negative terminal and the source terminal, and a bias terminal connected to the well terminal, and wherein the bias terminal is connectable via the internal switch to the detection terminal.

According to another aspect of the present invention, there is provided a battery protection circuit module including a first positive terminal and a first negative terminal electrically connected to electrode terminals of a battery bare cell, a second positive terminal and a second negative terminal electrically connected to a charger or an electronic device, a single field-effect transistor including a drain terminal, a source terminal, a gate terminal, and a well terminal, wherein the drain terminal is electrically connected to the first negative terminal and the source terminal is electrically connected to the second negative terminal, and a protection integrated circuit (P-IC) including a voltage source terminal connected between the first and second positive terminals, a reference terminal connected between the first negative terminal and the drain terminal, a detection terminal connected between the second negative terminal and the source terminal, a bias terminal connected to the well terminal, and a charging/discharging control signal output terminal connected to the gate terminal, to control whether to switch on the single field-effect transistor, through the charging/discharging control signal output terminal and control charging/discharging of the battery bare cell through the bias terminal, wherein the P-IC controls output of the bias terminal through an internal switch connected between the bias terminal and the voltage source terminal or the detection terminal, and controls a pull-up switch connected between the voltage source terminal and the detection terminal in a charging/discharging interruption operation to facilitate a charging/discharging resumption operation of the battery bare cell.

In the battery protection circuit module, the bias terminal may be always connected to one of the reference terminal and the detection terminal, and the internal switch may be connected between the bias terminal and the other of the reference terminal and the detection terminal, which is not always connected to the bias terminal.

In the battery protection circuit module, the P-IC may turn on the pull-up switch in an interruption operation performed by detecting overcharge or overdischarge, to detect connection of a charger or a load for charging or discharging resumption after charging or discharging interruption.

In the battery protection circuit module, the P-IC may include a diode connected between the bias terminal and the one of the reference terminal and the detection terminal, which is connected to the bias terminal, to have a forward direction corresponding to a direction toward the bias terminal.

In the battery protection circuit module, the bias terminal may be always connected via the diode to the reference terminal, and the internal switch may be interposed between the bias terminal and the detection terminal.

In the battery protection circuit module, the bias terminal may be always connected via the diode to the detection terminal, and the internal switch may be interposed between the bias terminal and the reference terminal.

In the battery protection circuit module, the P-IC may further include an internal resistor connected in series to the diode between the bias terminal and the one of the reference terminal and the detection terminal, which is connected to the bias terminal, to reduce a current flowing between the reference terminal and the detection terminal, to a level of a leakage current.

According to another aspect of the present invention, there is provided a battery pack including a battery bare cell, and the above-described battery protection circuit module connected to the battery bare cell.

According to the afore-described embodiments of the present invention, a battery protection circuit capable of achieving performance improvement by reducing operation resistance and of achieving a compact size. However, the scope of the present invention is not limited to the above-described effects.

MODE OF THE INVENTION

Figure 1:
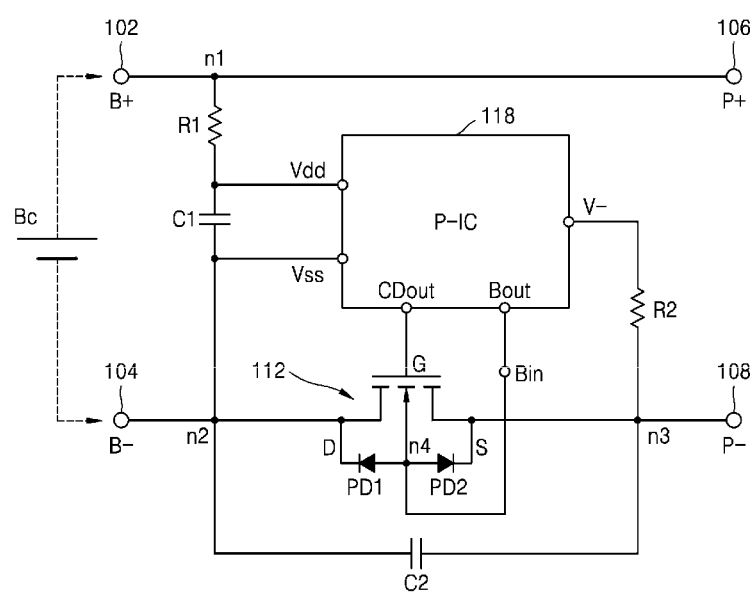
FIG. 1 is a circuit diagram of a battery protection circuit module according to an embodiment of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity.

In the following description, like reference numerals may denote like circuits in terms of a battery protection circuit but may denote like elements or circuit parts in terms of a battery protection circuit package.

An integrated circuit (IC) may refer to an electronic part in which a large number of elements are integrated into a chip to perform a certain complex function.

FIG. 1 is a circuit diagram of a battery protection circuit module according to an embodiment of the present invention.

Referring to FIG. 1, the battery protection circuit module according to the current embodiment may include a first positive terminal 102 and a first negative terminal 104 electrically connected to electrode terminals of a battery bare cell Bc, and a second positive terminal 106 and a second negative terminal 108 electrically connected to a charger or an electronic device. For example, the first positive terminal 102 may be an internal positive terminal B+ connected to a positive electrode of the battery bare cell Bc inside a battery pack, the first negative terminal 104 may be an internal negative terminal B− connected to a negative electrode of the battery bare cell Bc, the second positive terminal 106 may be an external positive terminal P+ connected to a positive electrode of the charger or the electronic device outside the battery pack, and the second negative terminal 108 may be an external negative terminal P− connected to a negative electrode of the charger or the electronic device.

Although not shown in FIG. 1, the battery protection circuit module according to some embodiments of the present invention may further include additional external connection terminals.

The battery protection circuit module may include a single field-effect transistor 112 connected between at least one of the first positive and negative terminals 102 and 104 and at least one of the second positive and negative terminals 106 and 108, and a protection integrated circuit (P-IC) 118 for controlling the single field-effect transistor 112.

For example, the single field-effect transistor 112 may include a drain terminal D, a source terminal S, a gate terminal G, and a well terminal Bin, and may be connected between the first and second negative terminals 104 and 108. For example, the drain terminal D may be electrically connected to the first negative terminal 104, and the source terminal S may be electrically connected to the second negative terminal 108. However, the drain and source terminals D and S are not fixed in the single field-effect transistor 112 and thus the names thereof may be switched.

The P-IC 118 for controlling the single field-effect transistor 112 may configure a protection circuit unit. The protection circuit unit may interrupt charging/discharging or operation of the battery bare cell Bc by detecting overdischarge, overcharge, and/or overcurrent of a battery. Specifically, the P-IC 118 may control the single field-effect transistor 112 to control overcharge and/or overdischarge of the battery bare cell Bc.

The single field-effect transistor 112 may be, for example, an N-type metal-oxide semiconductor field-effect transistor (NMOSFET). The single field-effect transistor 112 may include a pair of parasitic diodes PD1 and PD2 connected in opposite directions from a node n4 connected to the well terminal Bin. For example, the parasitic diode PD1 may be connected to have a forward direction corresponding to a direction from the node n4 toward the drain electrode D, and the parasitic diode PD2 may be connected to have a forward direction corresponding to a direction from the node n4 toward the source electrode S.

The P-IC 118 may include a control logic for controlling the single field-effect transistor 112. For example, the control logic may include a reference voltage setter, a comparer for comparing a reference voltage to a charging/discharging voltage, an overcurrent detector, and a charging/discharging detector.

Criteria for determining charging and discharging states may be changed in accordance with specifications required by a user, and the charging and discharging states are determined based on the criteria by detecting a voltage difference between terminals of the P-IC 118. For example, to output the control logic, the P-IC 118 may include a reference terminal Vss, a voltage source terminal Vdd, a detection terminal V−, a charging/discharging control signal output terminal CDout, and a bias terminal Bout.

The P-IC 118 may be connected via at least one passive element to nodes n1, n2, and n4. For example, the voltage source terminal Vdd may be connected via a resistor R1 to the node n1 between the first and second positive terminals 102 and 106, and the reference terminal Vss may be connected to the node n2 between the first negative terminal 104 and the drain terminal D. A capacitor C1 for preventing a short circuit between the two nodes n1 and n3 may be interposed between the reference terminal Vss and the voltage source terminal Vdd between the nodes n1 and n2. The detection terminal V− may be connected via a resistor R2 to the node n3. A capacitor C2 may be connected between the two nodes n2 and n3 in parallel with the single field-effect transistor 112.

Based on the above-described configuration, the P-IC 118 may apply a charging voltage or a discharging voltage through the voltage source terminal Vdd on the basis of a voltage of the reference terminal Vss, and detect charging/discharging and overcurrent states through the detection terminal V−. The charging/discharging control signal output terminal CDout may be connected to the gate terminal G of the single field-effect transistor 112 to control an on-off state of the single field-effect transistor 112 when the battery is charged and/or discharged.

When the battery is charged, a charging current flows from the second positive terminal 106 toward the first positive terminal 102, and from the first negative terminal 104 toward the second negative terminal 108. When the battery is discharged, a discharging current flows from the first positive terminal 102 toward the second positive terminal 106, and from the second negative terminal 108 toward the first negative terminal 104.

The P-IC 118 may operate to turn off the single field-effect transistor 112 by outputting a LOW signal through the charging/discharging control signal output terminal CDout when overcurrent or an overdischarge state is detected during battery discharging, or to turn off the single field-effect transistor 112 by outputting a LOW signal through the charging/discharging control signal output terminal CDout when overcurrent or an overcharge state is detected during battery charging. As such, a circuit between the first and second negative terminals 104 and 108 may be interrupted to protect the battery from overcharge, overdischarge, and/or overcurrent.

In addition, the P-IC 118 may control electric field states of the parasitic diodes PD1 and PD2 by applying a voltage to the well terminal Bin of the single field-effect transistor 112 through the bias terminal Bout other than the charging/discharging control signal output terminal CDout.

The resistor R1 and the capacitor C1 serve to stabilize fluctuations in a supply voltage of the P-IC 118. When the resistor R1 has a high resistance value, since a high voltage is detected due to a current penetrating into the P-IC 118, a resistance value of the resistor R1 may be set to a value equal to or less than a predetermined value, e.g., 1 KΩ. In addition, for stable operation, a capacitance value of the capacitor C1 may be appropriately adjusted and may have an appropriate value equal to or greater than, for example, 0.01 µF.

The resistors R1 and R2 serve as a current limiter when a charger provides a high voltage exceeding an absolute maximum rating of the P-IC 118 or when the charger is connected with wrong polarity. Since the resistors R1 and R2 are closely related to power consumption, normally, a sum of resistance values of the resistors R1 and R2 may be set to be greater than 1 KΩ. Since resumption may not occur after overcharge protection if the resistance value of the resistor R2 is excessively high, the resistance value of the resistor R2 may be set to a value equal to or less than 10 KΩ.

The capacitor C1 does not exert a strong influence on characteristics of battery protection circuit products, but is added upon user requests or for stability. The capacitor C1 is used to achieve system stabilization by increasing a tolerance to voltage fluctuations or external noise.

Optionally, although not shown in FIG. 1, a structure in which a resistor and a varistor are connected in parallel to each other may be added for electrostatic discharge (ESD) and surge protection. The varistor is an element capable of reducing a resistance thereof when overvoltage occurs, and may minimize circuit damage or the like due to overvoltage. In the above-described protection circuit unit, the number or configuration of passive elements may be appropriately changed in accordance with added functions.

According to the above-described battery protection circuit module, since the single field-effect transistor 112 is used instead of conventional dual field-effect transistors, resistance may be reduced to increase an overall operation speed and a reduction in volume may be additionally expected.

The above-described protection circuit unit may be implemented as a semiconductor chip and thus may be produced to a micrometer or nanometer size by using silicon process technology. For example, both of the P-IC 118 and the single field-effect transistor 112 may be produced as semiconductor chips and the passive elements, e.g., the resistors R1 and R2 and the capacitors C1 and C2, may also be produced in the form of chips. Such a chip structure may be easily mounted on a substrate by using surface mount technology (SMT).

Figure 2:
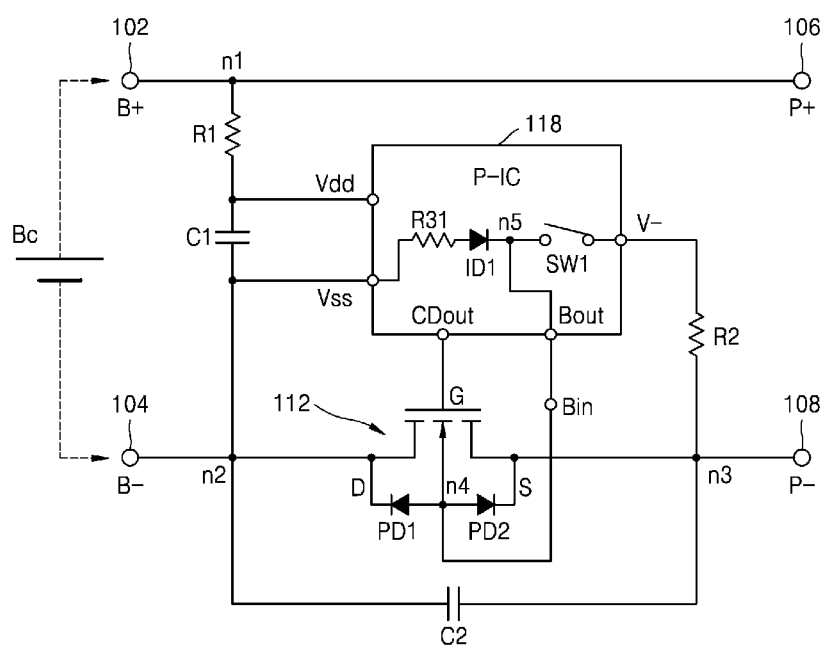
FIG. 2 is a circuit diagram of a battery protection circuit module according to another embodiment of the present invention.
Figure 3:
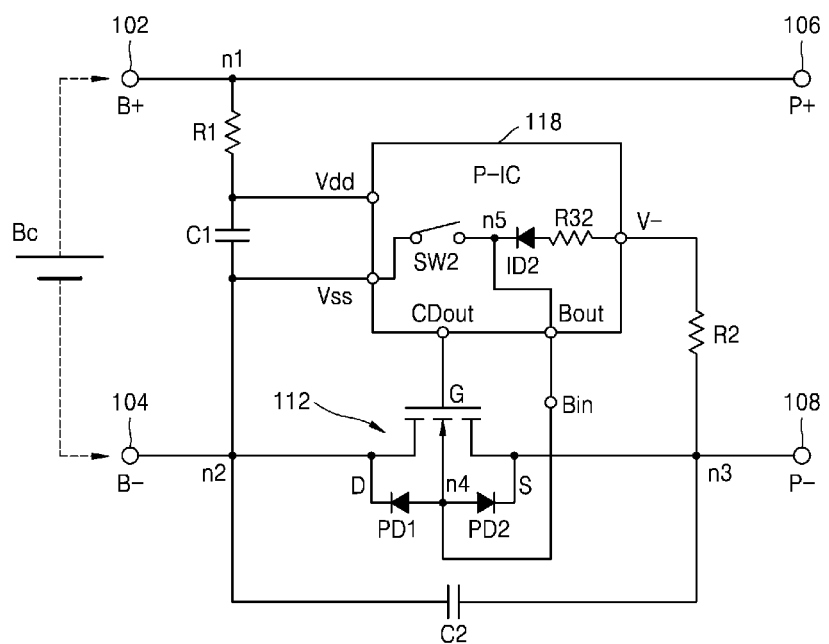
FIG. 3 is a circuit diagram of a battery protection circuit module according to another embodiment of the present invention.

FIGS. 2 and 3 are circuit diagrams of battery protection circuit modules according to other embodiments of the present invention. The battery protection circuit modules according to the current embodiments show detailed internal configurations of the P-IC 118 of the battery protection circuit module of FIG. 1, and thus repeated descriptions between the embodiments will be omitted herein.

Referring to FIGS. 2 and 3, the P-IC 118 may control charging/discharging of the battery bare cell Bc by controlling the gate terminal G to control whether to switch on the single field-effect transistor 112 and controlling a bias voltage of the well terminal Bin by using an internal switch SW1 or SW2.

In the P-IC 118, the bias terminal Bout may be always connected to one of the reference terminal Vss and the detection terminal V−, and the internal switch SW1 or SW2 may be connected between the bias terminal Bout and the other of the reference terminal Vss and the detection terminal V−, which is not always connected to the bias terminal Bout. Furthermore, the P-IC 118 may include a diode ID1 or ID2 connected between the bias terminal Bout and the one of the reference terminal Vss and the detection terminal V−, which is connected to the bias terminal Bout, to have a forward direction corresponding to a direction toward the bias terminal Bout.

Referring to FIG. 2, the bias terminal Bout may be always connected via the diode ID1 to the reference terminal Vss, and the internal switch SW1 may be interposed between the bias terminal Bout and the detection terminal V−. Specifically, the bias terminal Bout may be connected to a node n5 between the reference terminal Vss and the detection terminal V−, and the diode ID1 and an internal resistor R31 may be interposed between the node n5 and the reference terminal Vss. The internal switch SW1 may be interposed between the node n5 and the detection terminal V−. The diode ID1 may be connected between the node n5 and the reference terminal Vss to have a reverse direction corresponding to a direction from the node n5 toward the reference terminal Vss.

During normal charging, the internal switch SW1 may be turned off, and the single field-effect transistor 112 may be turned on such that a charging current may flow through a channel of the single field-effect transistor 112. When the internal switch SW1 is turned off, the bias terminal Bout may output a voltage of the reference terminal Vss.

However, when overcharge is detected during charging or when charge overcurrent is detected, the internal switch SW1 may be turned on and the single field-effect transistor 112 may be turned off. As described above, when the internal switch SW1 is turned on, the bias terminal Bout may be connected to the detection terminal V− and a voltage of the detection terminal V− may be applied to the well terminal Bin. Thus, when the battery is charged, the parasitic diode PD2 corresponding to a forward direction may be disabled and the parasitic diode PD1 corresponding to a reverse direction may have a certain internal voltage, thereby interrupting a charging current from the drain D toward the source S. As such, the charging current may be interrupted in a whole circuit.

For charging resumption, the single field-effect transistor 112 may be turned on by detecting a set voltage variation of the voltage source terminal Vdd, the detection terminal V−, and/or the reference terminal Vss to detect disconnection of a charger or connection of a load, and the internal switch SW1 may be turned off.

During normal discharging, the internal switch SW1 may be turned off, and the single field-effect transistor 112 may be turned on such that a discharging current may flow through a channel of the single field-effect transistor 112.

However, when overdischarge is detected during discharging or when discharge overcurrent is detected, the internal switch SW1 may be turned off and the single field-effect transistor 112 may also be turned off. When the internal switch SW1 is turned off, the bias terminal Bout may be continuously connected to the reference terminal Vss and a voltage of the reference terminal Vss may be applied to the well terminal Bin. Thus, when the battery is discharged, the parasitic diode PD1 corresponding to a forward direction may be disabled and the parasitic diode PD2 corresponding to a reverse direction may have an internal voltage, thereby interrupting a discharging current from the source S toward the drain D. As such, the discharging current may be interrupted in a whole circuit.

For discharging resumption, the single field-effect transistor 112 may be turned on by detecting a set voltage variation of the voltage source terminal Vdd, the detection terminal V−, and/or the reference terminal Vss to detect connection of a charger or disconnection of a load, and the internal switch SW1 may be continuously turned off.

In the above-described charging/discharging control method, a current between the reference terminal Vss and the bias terminal Bout or between the reference terminal Vss and the detection terminal V− may be reduced to a negligibly small value by increasing the value of the internal resistor R31. For example, the internal resistor R31 may have a value within a range of about 10 kΩ to about 500 kΩ, and thus a current passing through the P-IC 118 between the reference terminal Vss and the detection terminal V− may merely correspond to a level of a leakage current equal to or less then several to several hundred μA and thus may be negligibly small. For example, when overcharge, charge overcurrent, overdischarge, or discharge overcurrent is detected, not only a current passing through the single field-effect transistor 112 but also a current passing through the P-IC 118 may be interrupted.

Referring to FIG. 3, the bias terminal Bout may be always connected via the diode ID2 to the detection terminal V−, and the internal switch SW2 may be interposed between the bias terminal Bout and the reference terminal Vss. Specifically, the bias terminal Bout may be connected to the node n5 between the reference terminal Vss and the detection terminal V−, and the diode ID2 and an internal resistor R32 may be further interposed between the node n5 and the detection terminal V−. For example, the internal switch SW2 may be interposed between the node n5 and the reference terminal Vss. The diode ID2 may be connected between the node n5 and the detection terminal V− to have a reverse direction corresponding to a direction from the node n5 toward the detection terminal V−.

During normal charging, both of the internal switch SW2 and the single field-effect transistor 112 may be turned on such that a charging current may flow through a channel of the single field-effect transistor 112. When the internal switch SW2 is turned on, the bias terminal Bout may output a voltage of the reference terminal Vss.

However, when overcharge is detected during charging or when charge overcurrent is detected, the internal switch SW2 may be turned off and the single field-effect transistor 112 may be turned off. When the internal switch SW12 is turned off, the bias terminal Bout may be connected to the detection terminal V− and a voltage of the detection terminal V− may be applied to the well terminal Bin. Thus, when the battery is charged, the parasitic diode PD2 corresponding to a forward direction may be disabled and the parasitic diode PD1 corresponding to a reverse direction may have a certain internal voltage, thereby interrupting a charging current. As such, the charging current may be interrupted in a whole circuit. For charging resumption, both of the single field-effect transistor 112 and the internal switch SW2 may be turned on.

During normal discharging, both of the internal switch SW2 and the single field-effect transistor 112 may be turned on such that a discharging current may flow through a channel of the single field-effect transistor 112.

However, when overdischarge is detected during discharging or when discharge overcurrent is detected, the internal switch SW2 may be turned on and the single field-effect transistor 112 may be turned off. When the internal switch SW2 is turned on, the bias terminal Bout may be continuously connected to the reference terminal Vss and a voltage of the reference terminal Vss may be applied to the well terminal Bin. Thus, when the battery is discharged, the parasitic diode PD1 corresponding to a forward direction may be disabled and the parasitic diode PD2 corresponding to a reverse direction may have an internal voltage, thereby interrupting a discharging current from the source S toward the drain D. As such, the discharging current may be interrupted in a whole circuit.

For discharging resumption, both of the single field-effect transistor 112 and the internal switch SW2 may be turned on by detecting a set voltage variation of the voltage source terminal Vdd, the detection terminal V−, and/or the reference terminal Vss to detect connection of a charger or disconnection of a load.

In the above-described charging/discharging control method, a current between the reference terminal Vss and the bias terminal Bout or between the reference terminal Vss and the detection terminal V− may be reduced to a negligibly small value by increasing the value of the internal resistor R32. For example, the internal resistor R32 may have a value within a range of about 10 kΩ to about 500 kΩ, and thus a current passing through the P-IC 118 between the reference terminal Vss and the detection terminal V− may merely correspond to a leakage current equal to or less then several to several hundred μA and thus may be negligibly small. For example, when overcharge, charge overcurrent, overdischarge, or discharge overcurrent is detected, not only a current passing through the single field-effect transistor 112 but also a current passing through the P-IC 118 may be interrupted.

According to the afore-described embodiments, charging/discharging of the battery bare cell Bc may be controlled using the single field-effect transistor 112 by controlling an on-off state of the single field-effect transistor 112 and controlling a bias voltage output through the well terminal Bin, by using the internal switch SW1 or SW2.

Since the bias voltage may be controlled using only one internal switch SW1 or SW2 by always connecting the bias terminal Bout to one of the reference terminal Vss and the detection terminal V−, a switch structure may be simplified.

In addition, using the resistor R31 or R32 and the diode ID1 or ID2, a current flowing into the P-IC 118 for charging/discharging control may be significantly reduced to a level of a leakage current and charging/discharging resumption may be enabled by detecting connection of a charger or a load.

Furthermore, in some embodiments, the P-IC 118 may not include a transistor but a conventional inverter circuit may be used to switch a voltage, thereby simplifying a circuit structure.

Figure 4:
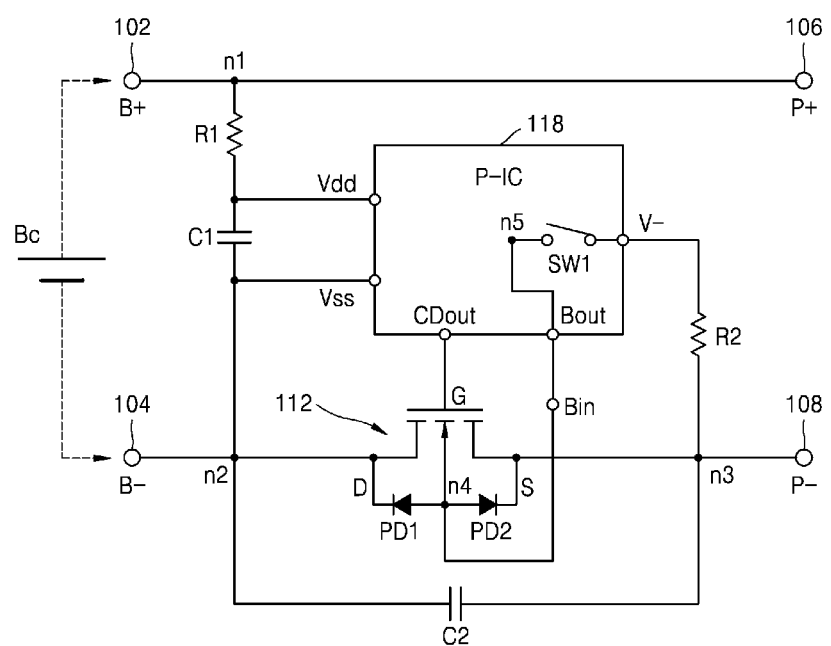
FIG. 4 is a circuit diagram of a battery protection circuit module according to another embodiment of the present invention.

FIG. 4 is a circuit diagram of a battery protection circuit module according to another embodiment of the present invention. The battery protection circuit module according to the current embodiment is modified from the battery protection circuit module of FIG. 2, and thus repeated descriptions therebetween will be omitted herein.

Referring to FIG. 4, no line may be connected between the reference terminal Vss and the node n5, and the bias terminal Bout may pass through the node n5 and may be connected via the internal switch SW1 to the detection terminal V−. That is, the structure of FIG. 4 may correspond to the structure of FIG. 2, from which the diode ID1 and the resistor R31 are omitted.

During normal charging, the internal switch SW1 may be turned off, and the single field-effect transistor 112 may be turned on such that a charging current may flow through a channel of the single field-effect transistor 112. When the internal switch SW1 is turned off, the bias terminal Bout may be floated.

However, when overcharge is detected during charging or when charge overcurrent is detected, the internal switch SW1 may be turned on and the single field-effect transistor 112 may be turned off. As described above, when the internal switch SW1 is turned on, the bias terminal Bout may be connected to the detection terminal V− and a voltage of the detection terminal V− may be applied to the well terminal Bin. Thus, when the battery is charged, the parasitic diode PD2 corresponding to a forward direction may be disabled and the parasitic diode PD1 corresponding to a reverse direction may have a certain internal voltage, thereby interrupting a charging current. As such, the charging current may be interrupted in a whole circuit.

For charging resumption, the single field-effect transistor 112 may be turned on by detecting a set voltage variation of the voltage source terminal Vdd, the detection terminal V−, and/or the reference terminal Vss to detect disconnection of a charger or connection of a load, and the internal switch SW1 may be turned off.

During normal discharging, the internal switch SW1 may be turned off, and the single field-effect transistor 112 may be turned on such that a discharging current may flow through a channel of the single field-effect transistor 112.

However, when overdischarge is detected during discharging or when discharge overcurrent is detected, the internal switch SW1 may be turned off and the single field-effect transistor 112 may also be turned off. When the internal switch SW1 is turned off, the bias terminal Bout may be floated. In this case, by designing the single field-effect transistor 112 to have an internal voltage, the discharging current through the parasitic diodes PD1 and PD2 may be interrupted without connecting a voltage of the reference terminal Vss to the bias terminal Bout. As such, the discharging current may be interrupted in a whole circuit.

For discharging resumption, the single field-effect transistor 112 may be turned on by detecting a set voltage variation of the voltage source terminal Vdd, the detection terminal V−, and/or the reference terminal Vss to detect connection of a charger or disconnection of a load, and the internal switch SW1 may be continuously turned off.

Figure 5:
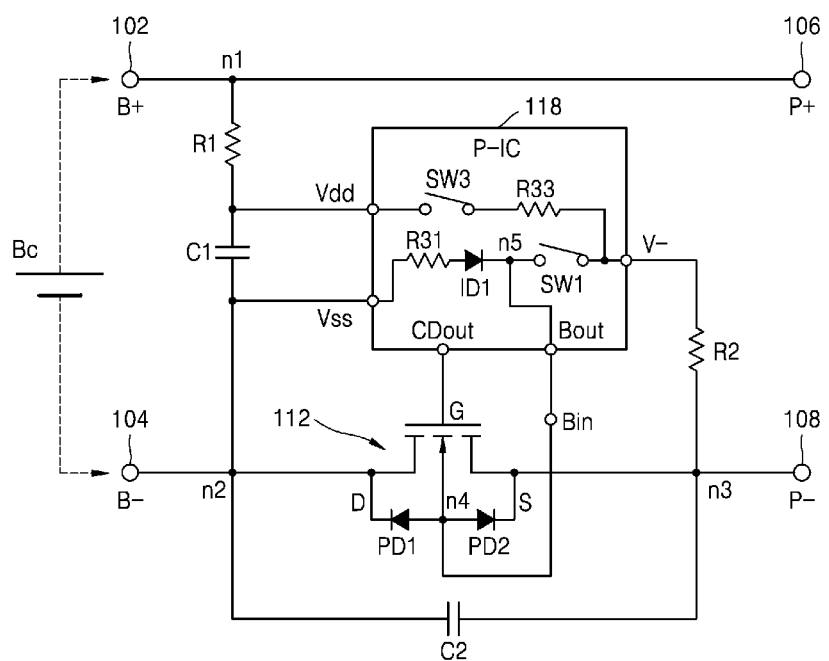
FIG. 5 is a circuit diagram showing a modified example of the battery protection circuit module of FIG. 2.

FIG. 5 is a circuit diagram showing a modified example of the battery protection circuit module of FIG. 2. The battery protection circuit module according to the current embodiment is obtained by adding at least one element to or modifying at least one element of the battery protection circuit module of FIG. 2, and thus repeated descriptions between the two embodiments will be omitted herein.

Referring to FIG. 5, the P-IC 118 may further include a pull-up switch SW3 connected between the voltage source terminal Vdd and the detection terminal V− to facilitate a charging/discharging resumption operation of the battery bare cell Bc. In addition, the P-IC 118 may further include a resistor R33 connected in series to the pull-up switch SW3 between the voltage source terminal Vdd and the detection terminal V−. The P-IC 118 may control the pull-up switch SW3 in a charging/discharging interruption operation to facilitate the charging/discharging resumption operation of the battery bare cell Bc.

For example, to detect connection of a charger or a load for charging or discharging resumption after charging or discharging interruption, the P-IC 118 may turn on the pull-up switch SW3 in the interruption operation performed by detecting overcharge or overdischarge. Except that the above-described operation of the pull-up switch SW3 is added, operation of the battery protection circuit module of the current embodiment is the same as that of the battery protection circuit module of FIG. 2.

For example, during normal charging, the internal switch SW1 and the pull-up switch SW3 may be turned off, and the single field-effect transistor 112 may be turned on such that a charging current may flow through a channel of the single field-effect transistor 112. However, when overcharge is detected during charging or when charge overcurrent is detected, the internal switch SW1 and the pull-up switch SW3 may be turned on and the single field-effect transistor 112 may be turned off.

During normal discharging, the internal switch SW1 and the pull-up switch SW3 may be turned off, and the single field-effect transistor 112 may be turned on such that a discharging current may flow through a channel of the single field-effect transistor 112. However, when overdischarge is detected during discharging or when discharge overcurrent is detected, the internal switch SW1 may be turned off and the single field-effect transistor 112 may also be turned off. Additionally, when overdischarge is detected, the pull-up switch SW3 may be turned on.

According to the current embodiment, connection of a charger and/or disconnection of a load may be detected by adding the pull-up switch SW3 for the resumption operation. For example, when the interruption operation is performed by detecting overcharge, charge overcurrent, and/or overdischarge, unlike a conventional case, voltage variations of the voltage source terminal Vdd and the detection terminal V− may be detected by turning on the pull-up switch SW3, and thus a variation for the resumption operation may be detected even when the single field-effect transistor 112 is used.

Figure 6:
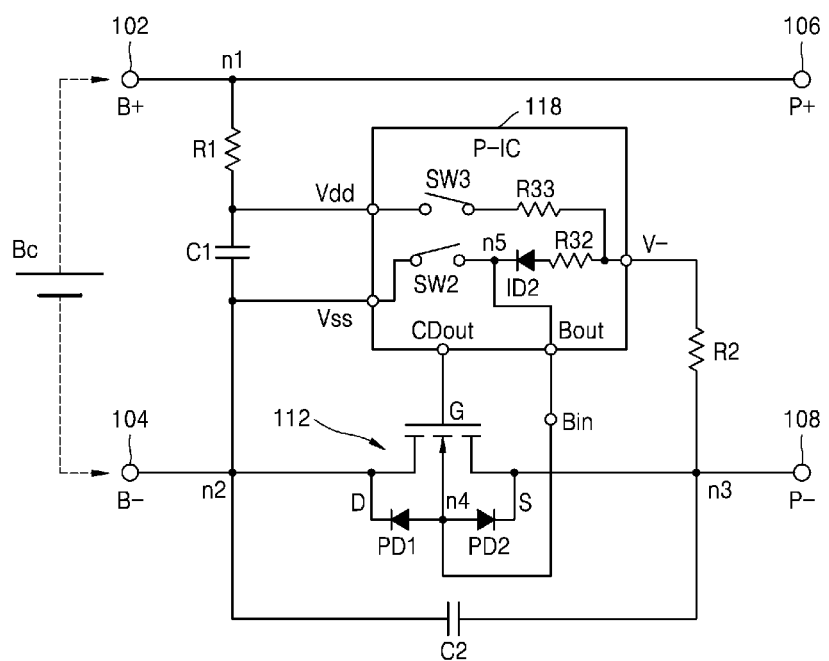
FIG. 6 is a circuit diagram showing a modified example of the battery protection circuit module of FIG. 3.

FIG. 6 is a circuit diagram showing a modified example of the battery protection circuit module of FIG. 3. The battery protection circuit module according to the current embodiment is obtained by adding at least one element to or modifying at least one element of the battery protection circuit module of FIG. 3, and thus repeated descriptions between the two embodiments will be omitted herein.

Referring to FIG. 6, the P-IC 118 may further include a pull-up switch SW3 connected between the voltage source terminal Vdd and the detection terminal V− to facilitate a charging/discharging resumption operation of the battery bare cell Bc. In addition, the P-IC 118 may further include a resistor R33 connected in series to the pull-up switch SW3 between the voltage source terminal Vdd and the detection terminal V−. The P-IC 118 may control the pull-up switch SW3 in a charging/discharging interruption operation to facilitate the charging/discharging resumption operation of the battery bare cell Bc. Detailed descriptions of operation of the pull-up switch SW3 are provided above in relation to FIG. 5.

Figure 7:
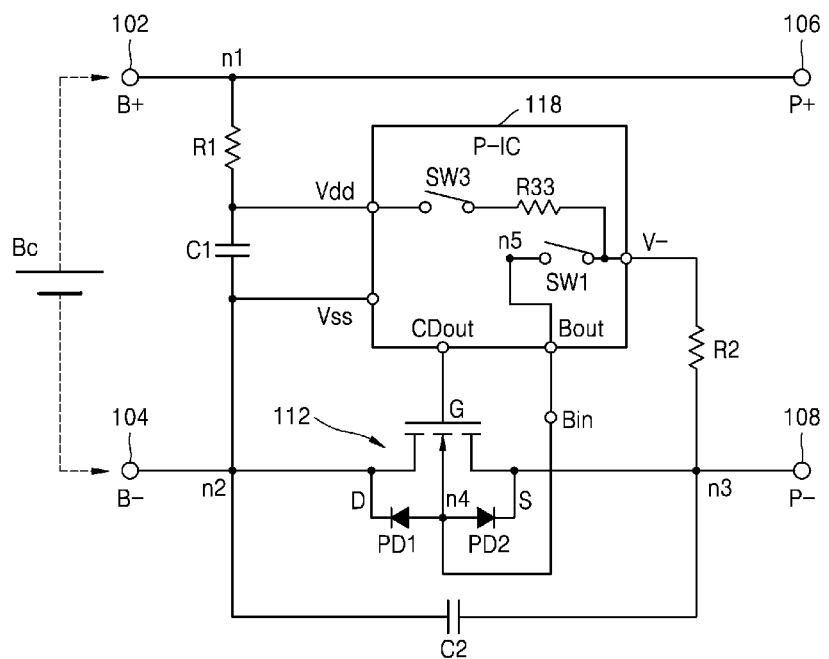
FIG. 7 is a circuit diagram showing a modified example of the battery protection circuit module of FIG. 4.

FIG. 7 is a circuit diagram showing a modified example of the battery protection circuit module of FIG. 4. The battery protection circuit module according to the current embodiment is obtained by adding at least one element to or modifying at least one element of the battery protection circuit module of FIG. 4, and thus repeated descriptions between the two embodiments will be omitted herein.

Referring to FIG. 7, the P-IC 118 may further include a pull-up switch SW3 connected between the voltage source terminal Vdd and the detection terminal V− to facilitate a charging/discharging resumption operation of the battery bare cell Bc. In addition, the P-IC 118 may further include a resistor R33 connected in series to the pull-up switch SW3 between the voltage source terminal Vdd and the detection terminal V−. The P-IC 118 may control the pull-up switch SW3 in a charging/discharging interruption operation to facilitate the charging/discharging resumption operation of the battery bare cell Bc. Detailed descriptions of operation of the pull-up switch SW3 are provided above in relation to FIG. 5.

Figure 8:
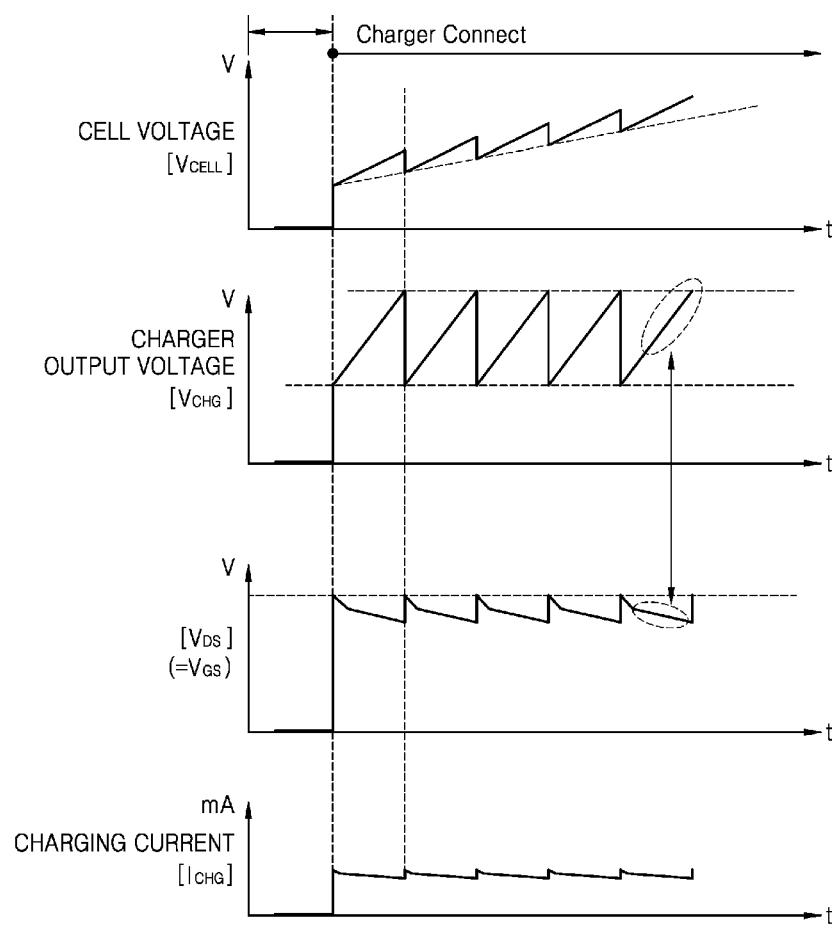
FIG. 8 is a graph showing a 0V charging operation of a battery protection circuit module according to an embodiment of the present invention.

FIG. 8 is a graph showing a 0V charging operation of a battery protection circuit module according to an embodiment of the present invention.

A 0V charging function of the above-described battery protection circuit modules of FIGS. 1 to 7 will now be described in detail. When the battery bare cell Bc is in an overdischarge state, that is, when a cell voltage is about 0V, it may be set about whether to reuse the battery bare cell Bc.

Referring to FIG. 8, when a cell voltage is about 0V, 0V charging for reusing the battery bare cell Bc may be performed as described below.

During the 0V charging operation, a LOW voltage may be continuously applied to the gate terminal G of the single field-effect transistor 112. To this end, the charging/discharging control signal output terminal CDout of the P-IC 118 may output a LOW voltage, e.g., the reference voltage Vss, to the gate terminal G.

When a charger is connected, due to a voltage drop of the source terminal S of the single field-effect transistor 112, a voltage difference $V_{GS}$ between the gate terminal G and the source terminal S may be increased above a threshold voltage $V_{th}$ of the single field-effect transistor 112, and the single field-effect transistor 112 may be turned on such that a charging current may flow (charging operation).

However, when the charging current flows longer than a certain period, the voltage of the source terminal S may be increased to reduce the voltage difference $V_{GS}$ between the gate terminal G and the source terminal S below the threshold voltage $V_{th}$, and the single field-effect transistor 112 may be turned off such that the charging current may be interrupted (interruption operation).

When the charging current is interrupted while the charger is being connected, due to another voltage drop of the source terminal S of the single field-effect transistor 112, the voltage difference $V_{GS}$ between the gate terminal G and the source terminal S may be increased above the threshold voltage $V_{th}$, and the single field-effect transistor 112 may be turned on such that the charging current may flow (charging operation).

Ultimately, as the charging and interruption operations are repeated, the battery bare cell Bc may be charged to a preset range.

Figure 9:
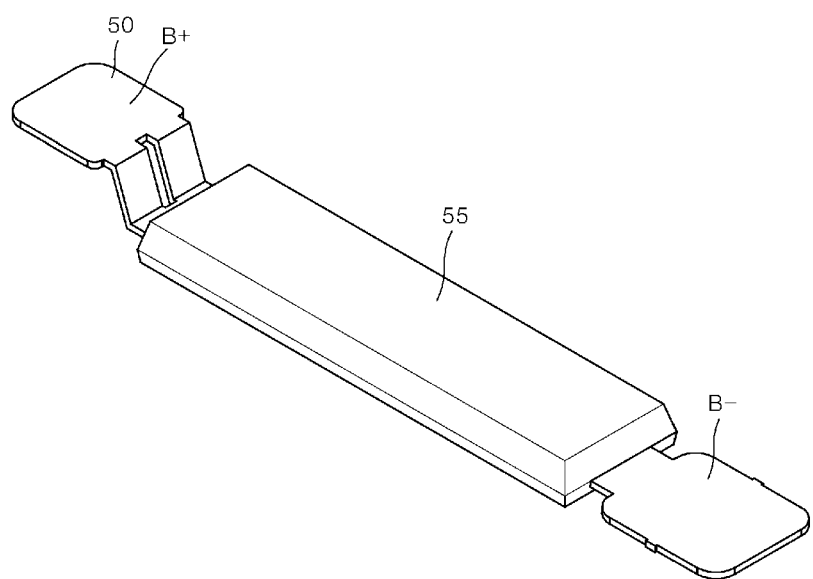
FIG. 9 is a perspective view of a battery protection circuit module according to an embodiment of the present invention.

FIG. 9 is a perspective view of a battery protection circuit module according to an embodiment of the present invention.

Referring to FIG. 9, the above-described battery protection circuit module may be mounted on a substrate 50 and may be implemented as a package. For example, the substrate 50 may include a PCB or a lead frame. A protection circuit unit for configuring the battery protection circuit module may be encapsulated into one package by using a molding material 55.

In a modified embodiment of the current embodiment, the above-described protection circuit unit may be mounted on the substrate 50 in the form of a chip scale package (CSP) to reduce a volume thereof.

In another modified embodiment of the current embodiment, the single field-effect transistor 112 and the P-IC 118 may be produced in a stacked package structure or a package on package (POP) structure.

Figure 10:
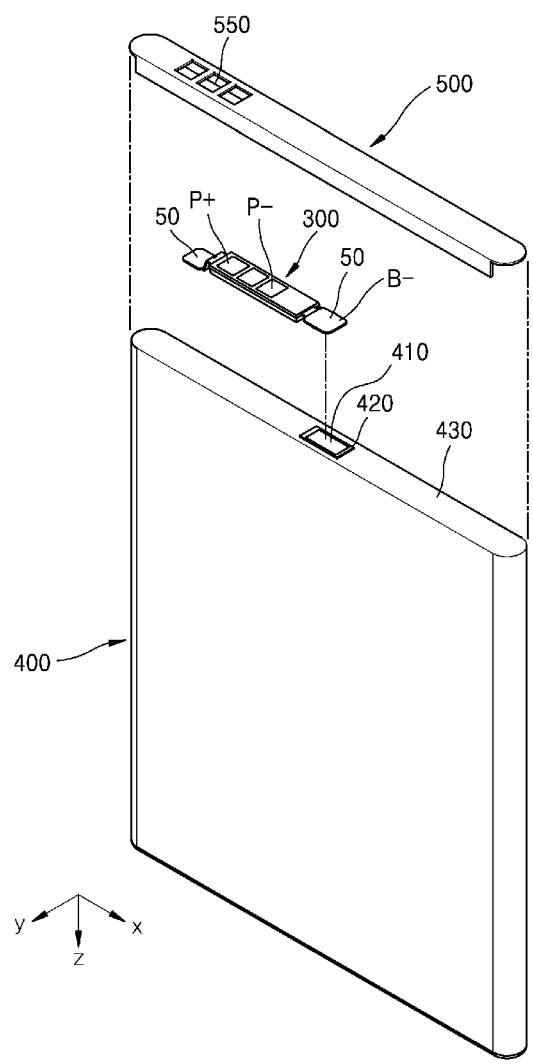
FIG. 10 is an exploded perspective view of a battery pack according to an embodiment of the present invention.

FIG. 10 is an exploded perspective view of a battery pack according to an embodiment of the present invention.

Referring to FIG. 10, the battery pack is configured by inserting the above-described battery protection circuit module between an upper case 500 and a top surface of a battery bare cell embedded in a battery can 400. The upper case 500 is made of plastic and/or metal and has through holes 550 to expose external connection terminals P+ and P− therethrough.

The battery bare cell includes an electrode assembly and a cap assembly. The electrode assembly may include a positive plate produced by coating a positive current collector with a positive active material, a negative plate produced by coating a negative current collector with a negative active material, and a separator interposed between the positive and negative plates to prevent a short circuit between the two electrode plates and to enable movement of lithium ions. A positive tab attached to the positive plate and a negative tab attached to the negative plate protrude from the electrode assembly.

The cap assembly includes a negative terminal 410, a gasket 420, a cap plate 430, etc. The cap plate 430 may serve as a positive terminal. The negative terminal 410 may also be called a negative cell or an electrode cell. The gasket 420 may be made of an insulating material to insulate the negative terminal 410 and the cap plate 430 from each other. Accordingly, electrode terminals of the battery bare cell may include the negative terminal 410 and the cap plate 430.

Specifically, the electrode terminals of the battery bare cell may include a plate 430 having a first polarity (e.g., positive polarity), and an electrode cell 410 having a second polarity (e.g., negative polarity) and located at the center of the plate 430. A first internal connection terminal lead B+ may be bonded and electrically connected to the plate 430 having the first polarity (e.g., positive polarity), and a second internal connection terminal lead B− may be bonded and electrically connected to the electrode cell 410 having the second polarity (e.g., negative polarity). In some embodiments, a length of a lead frame 50 may correspond to a length from an end of the plate 430 having the first polarity (e.g., positive polarity) to the electrode cell 410 having the second polarity (e.g., negative polarity).

According to some embodiments, since the battery protection circuit module is mounted only at a single side of a top surface of the electrode cell 410 having the second polarity (e.g., negative electrode), a battery size may be reduced or a battery capacitance may be increased. For example, the capacitance of a battery may be increased by further providing another cell on the other side of the electrode cell 410, or the size of a product having the battery may be reduced by providing a chip having another additional function on the other side of the electrode cell 410.

While the present invention has been particularly shown and described with reference to embodiments thereof, it will be understood by one of ordinary skill in the art that various changes in form and details may be made therein without departing from the spirit and scope of the present invention as defined by the following claims.

EXPLANATION OF REFERENCE NUMERALS

112: Single field-effect transistor
118: Protection integrated circuit (P-IC)

The invention claimed is:

1. A battery protection circuit module comprising:
   a first positive terminal and a first negative terminal electrically connected to electrode terminals of a battery bare cell;
   a second positive terminal and a second negative terminal electrically connected to a charger or an electronic device;
   a single field-effect transistor comprising a drain terminal, a source terminal, a gate terminal, and a well terminal, wherein the drain terminal is electrically connected to the first negative terminal and the source terminal is electrically connected to the second negative terminal; and
   a protection integrated circuit (P-IC) for controlling charging/discharging of the battery bare cell by controlling the gate terminal to control whether to switch on the single field-effect transistor and controlling a bias voltage of the well terminal by using an internal switch,
   wherein the P-IC comprises a reference terminal connected between the first negative terminal and the drain terminal, a detection terminal connected between the second negative terminal and the source terminal, and a bias terminal connected to the well terminal,
   wherein the bias terminal is always connected to one of the reference terminal and the detection terminal,
   wherein the internal switch is connected between the bias terminal and the other of the reference terminal and the detection terminal, which is not always connected to the bias terminal, and
   wherein the P-IC comprises a diode inside the P-IC, connected between the bias terminal and the one of the reference terminal and the detection terminal, which is connected to the bias terminal, to have a forward direction corresponding to a direction toward the bias terminal.

2. The battery protection circuit module of claim 1, wherein the bias terminal is always connected via the diode to the reference terminal, and
   wherein the internal switch is interposed between the bias terminal and the detection terminal.

3. The battery protection circuit module of claim 2, wherein the internal switch is turned on when overcharge is detected.

4. The battery protection circuit module of claim 1, wherein the bias terminal is always connected via the diode to the detection terminal, and
wherein the internal switch is interposed between the bias terminal and the reference terminal.

5. The battery protection circuit module of claim 4, wherein the internal switch is turned off when overdischarge is detected.

6. The battery protection circuit module of claim 1, wherein the P-IC further comprises an internal resistor connected in series to the diode between the bias terminal and the one of the reference terminal and the detection terminal, which is connected to the bias terminal, to reduce a current flowing between the reference terminal and the detection terminal, to a level of a leakage current.

7. The battery protection circuit module of claim 6, wherein the P-IC performs charging or discharging resumption after charging or discharging interruption by detecting connection of a charger or a load and turning on the single field-effect transistor.

8. A battery pack comprising:
a battery bare cell; and
the battery protection circuit module of claim 1 connected to the battery bare cell.

9. A battery protection circuit module comprising:
a first positive terminal and a first negative terminal electrically connected to electrode terminals of a battery bare cell;
a second positive terminal and a second negative terminal electrically connected to a charger or an electronic device;
a single field-effect transistor comprising a drain terminal, a source terminal, a gate terminal, and a well terminal, wherein the drain terminal is electrically connected to the first negative terminal and the source terminal is electrically connected to the second negative terminal; and
a protection integrated circuit (P-IC) comprising a voltage source terminal connected between the first and second positive terminals, a reference terminal connected between the first negative terminal and the drain terminal, a detection terminal connected between the second negative terminal and the source terminal, a bias terminal connected to the well terminal, and a charging/discharging control signal output terminal connected to the gate terminal, to control whether to switch on the single field-effect transistor, through the charging/discharging control signal output terminal and control charging/discharging of the battery bare cell through the bias terminal,
wherein the P-IC controls output of the bias terminal through an internal switch connected between the bias terminal and the voltage source terminal or the detection terminal, and controls a pull-up switch connected between the voltage source terminal and the detection terminal in a charging/discharging interruption operation to facilitate a charging/discharging resumption operation of the battery bare cell,
wherein the P-IC comprises a diode inside the P-IC, connected between the bias terminal and the one of the reference terminal and the detection terminal, which is connected to the bias terminal, to have a forward direction corresponding to a direction toward the bias terminal.

10. The battery protection circuit module of claim 9, wherein the bias terminal is always connected to one of the reference terminal and the detection terminal, and
wherein the internal switch is connected between the bias terminal and the other of the reference terminal and the detection terminal, which is not always connected to the bias terminal.

11. The battery protection circuit module of claim 10, wherein the P-IC turns on the pull-up switch in an interruption operation performed by detecting overcharge or overdischarge, to detect connection of a charger or a load for charging or discharging resumption after charging or discharging interruption.

12. The battery protection circuit module of claim 9, wherein the bias terminal is always connected via the diode to the reference terminal, and
wherein the internal switch is interposed between the bias terminal and the detection terminal.

13. The battery protection circuit module of claim 12, wherein the internal switch is turned on when overcharge is detected.

14. The battery protection circuit module of claim 9, wherein the bias terminal is always connected via the diode to the detection terminal, and
wherein the internal switch is interposed between the bias terminal and the reference terminal.

15. The battery protection circuit module of claim 14, wherein the internal switch is turned off when overdischarge is detected.

16. The battery protection circuit module of claim 9, wherein the P-IC further comprises an internal resistor connected in series to the diode between the bias terminal and the one of the reference terminal and the detection terminal, which is connected to the bias terminal, to reduce a current flowing between the reference terminal and the detection terminal, to a level of a leakage current.

17. A battery pack comprising:
a battery bare cell; and
the battery protection circuit module of claim 9 connected to the battery bare cell.

* * * * *